US012718574B2

(12) United States Patent
Fukui

(10) Patent No.: US 12,718,574 B2
(45) Date of Patent: Aug. 25, 2026

(54) LEARNING APPARATUS, LEARNING METHOD, AND TRACKING APPARATUS

(71) Applicant: NEC Corporation, Tokyo (JP)

(72) Inventor: Hiroshi Fukui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 247 days.

(21) Appl. No.: 18/725,876

(22) PCT Filed: Mar. 8, 2022

(86) PCT No.: PCT/JP2022/009889
§ 371 (c)(1),
(2) Date: Jul. 1, 2024

(87) PCT Pub. No.: WO2023/170772
PCT Pub. Date: Sep. 14, 2023

(65) Prior Publication Data

US 2025/0086974 A1 Mar. 13, 2025

(51) Int. Cl.
*G06V 20/52* (2022.01)
*G06V 10/74* (2022.01)

(52) U.S. Cl.
CPC ............ *G06V 20/52* (2022.01); *G06V 10/761* (2022.01); *G06V 2201/07* (2022.01); *G06V 2201/10* (2022.01)

(58) Field of Classification Search
CPC .. G06V 20/52; G06V 10/761; G06V 2201/07; G06V 2201/10; G06V 10/82; G06T 7/00
See application file for complete search history.

(56) References Cited

U.S. PATENT DOCUMENTS

| | | | | |
|---|---|---|---|---|
| 2018/0137628 | A1 | 5/2018 | Shoda et al. | |
| 2019/0347806 | A1* | 11/2019 | Vajapey | G06T 7/20 |
| 2021/0264153 | A1* | 8/2021 | Viss | G06F 9/54 |
| 2022/0358314 | A1* | 11/2022 | Shen | G06V 10/255 |
| 2022/0366248 | A1 | 11/2022 | Piao | |

FOREIGN PATENT DOCUMENTS

| | | | |
|---|---|---|---|
| JP | 2018-081545 | A | 5/2018 |
| JP | 2019-207561 | A | 12/2019 |
| JP | 2020-181268 | A | 11/2020 |
| WO | 2020/022362 | A1 | 1/2020 |
| WO | 2021/070324 | A1 | 4/2021 |

OTHER PUBLICATIONS

International Search Report for PCT Application No. PCT/JP2022/009889, mailed on Jun. 7, 2022.

* cited by examiner

*Primary Examiner* — Premal R Patel
(74) *Attorney, Agent, or Firm* — Sughrue Mion, PLLC

(57) ABSTRACT

A learning apparatus 1 comprises: an acquisition unit 11 acquires a video MV; an extraction unit 12 extracts sets from frames in the video MV, each of the sets including a first frame and a second frame different from the first frame; a detection unit 13 detects objects in the first and second frames respectively; an association unit 14 associates the object in the first frame with the object in the second frame; and a learning unit 15 makes the association unit 14 learn an association method for the object based on association results by the association unit 14 with respect to the sets, wherein the sets include: a first set where a time interval between the first and second frames is a first interval; and a second set where a time interval between the first and second frames is a second interval different from the first interval.

10 Claims, 10 Drawing Sheets

A
B
P1F
[1]
[3]
A
B

A
B
P1B
[1]
[3]
A
B

A
B
P1F
[1]
P1B
[1]
A
B

A
B
P2F
[4]
[8]
A
B

B
A
P2B
[4]
[8]
A
B

A
B
P2F
[4]
P2B
[4]
B
A

A
[6]

[3]
A a
[6]
b a
[3]
b

LEARNING APPARATUS, LEARNING METHOD, AND TRACKING APPARATUS

This application is a National Stage Entry of PCT/JP2022/009889 filed on Mar. 8, 2022, the contents of all of which are incorporated herein by reference, in their entirety.

TECHNICAL FIELD

This disclosure relates to technical fields with respect to a learning apparatus, a learning method, a tracking apparatus, a tracking method, and a recording medium.

BACKGROUND ART

There is disclosed in the patent literature 1 a technique in which environmental information on images for learning is acquired, and learning of an object detecting model that detects a target object included in an image for learning is performed using the environmental information. There is disclosed in the patent literature 2 a technique for performing motion detection without increasing computational cost, in such a way that a target image is acquired, a vector related to a motion is derived from the target image acquired, and the motion detection is performed by tracking the vector derived. There is disclosed in the patent literature 3 a technique for accurately associating the same object between frames, in which: from each of the frames, a feature map characterized by a spatial structure of a space captured in the frame is extracted; on the basis of each of the frames, a target object captured in the frame is specified; an area mask indicating an area of the target object is extracted; on the basis of the feature map, an object candidate area, and the area mask, an area feature representing the feature of the object candidate area is extracted for each frame; using the area features, each being extracted for each frame, the object is associated with each other between the frames. There is disclosed in the patent literature 4 a technique in which: a feature amount extractor is included; learning data used for learning of an image recognizer which does not include a generator is acquired; and the image recognizer is learned with using a first index and a second index, and without a third index, the first index being used for the supervised learning where an labeled image included in the acquired learning data is used, the second index relating a relation of feature amount data with each other, the feature amount data being outputted when each of images obtained based on images included in the learning data is inputted to the feature amount extractor; and being used for the unsupervised learning, and the third index: relating a relation of output data with each other, the output data being outputted when each of images obtained based on images included in the learning data is inputted to the image recognizer; and being used for the unsupervised learning,

CITATION LIST

Patent Literature

Patent Literature 1: WO-A1-2021/070324
Patent Literature 2: WO-A1-2020/022362
Patent Literature 3: JP 2020-181268 A
Patent Literature 4: JP 2019-207561 A

SUMMARY

Technical Problem

The subject of this disclosure is to provide a learning apparatus, a learning method, a tracking apparatus, a tracking method, and a recording medium for improving the techniques disclosed in the citation list.

Solution to Problem

One aspect of a learning apparatus comprises: an acquisition unit that is configured to acquire a single video; an extraction unit that is configured to extract a plurality of sets from a plurality of frames included in the single video, each of the plurality of sets including a first frame and a second frame different from the first frame; a detection unit that is configured to detect an object included in the first frame and the object included in the second frame respectively; an association unit that is configured to associate the object included in the first frame and the object included in the second frame with each other; and a learning unit that is configured to make the association unit learn an association method for the object based on association results by the association unit with respect to the plurality of sets, wherein the plurality of sets include: a first set in which a time interval between the first and second frames is a first interval; and a second set in which a time interval between the first and second frames is a second interval different from the first interval.

One aspect of a learning method comprises: acquiring a single video; extracting a plurality of sets from a plurality of frames included in the single video, each of the plurality of sets including a first frame and a second frame different from the first frame; detecting an object included in the first frame and the object included in the second frame respectively; associating, by using an association mechanism, the object included in the first frame and the object included in the second frame with each other; and making the association mechanism learn an association method for the object based on association results by the association mechanism with respect to the plurality of sets, wherein the plurality of sets include: a first set in which a time interval between the first and second frames is a first interval; and a second set in which a time interval between the first and second frames is a second interval different from the first interval.

A first aspect of a recording medium on which a computer program is recorded, the computer program being configured to allow a computer to execute a learning method comprises: acquiring a single video; extracting a plurality of sets from a plurality of frames included in the single video, each of the plurality of sets including a first frame and a second frame different from the first frame; detecting an object included in the first frame and the object included in the second frame respectively; associating, by using an association mechanism, the object included in the first frame and the object included in the second frame with each other; and making the association mechanism learn an association method for the object based on association results by the association mechanism with respect to the plurality of sets, wherein the plurality of sets include: a first set in which a time interval between the first and second frames is a first interval; and a second set in which a time interval between the first and second frames is a second interval different from the first interval.

One aspect of a tracking apparatus comprises: an acquisition unit that is configured to acquire a video; and a tracking unit that is configured to comprise an association unit generated by being made to learn an association method for an object, by extracting a plurality of sets from a plurality of frames included in a single video, each of the plurality of sets including a first frame and a second frame different from the first frame, and detecting the object included in the first frame and the object included in the second frame respectively, based on association results with respect to the plurality of sets where the object included in the first frame and the object included in the second frame that are associated with each other, and track the object included in the video based on association of the object by the association unit, wherein the plurality of sets include: a first set in which a time interval between the first and second frames is a first interval; and a second set in which a time interval between the first and second frames is a second interval different from the first interval.

One aspect of a tracking method comprises: acquiring a video; and comprising an association unit generated by being made to learn an association method for an object, by extracting a plurality of sets from a plurality of frames included in a single video, each of the plurality of sets including a first frame and a second frame different from the first frame, and detecting the object included in the first frame and the object included in the second frame respectively, based on association results with respect to the plurality of sets where the object included in the first frame and the object included in the second frame that are associated with each other, and tracking the object included in the video based on association of the object by the association unit, wherein the plurality of sets include: a first set in which a time interval between the first and second frames is a first interval; and a second set in which a time interval between the first and second frames is a second interval different from the first interval.

A second aspect of a recording medium on which a computer program is stored, the computer program being configured to allow a computer to execute a tracking method comprising: acquiring a video; and comprising an association unit generated by being made to learn an association method for an object, by extracting a plurality of sets from a plurality of frames included in a single video, each of the plurality of sets including a first frame and a second frame different from the first frame, and detecting the object included in the first frame and the object included in the second frame respectively, based on association results with respect to the plurality of sets where the object included in the first frame and the object included in the second frame that are associated with each other, and tracking the object included in the video based on association of the object by the association unit, wherein the plurality of sets include: a first set in which a time interval between the first and second frames is a first interval; and a second set in which a time interval between the first and second frames is a second interval different from the first interval.

DESCRIPTION OF EXAMPLE EMBODIMENTS

Figure 1:
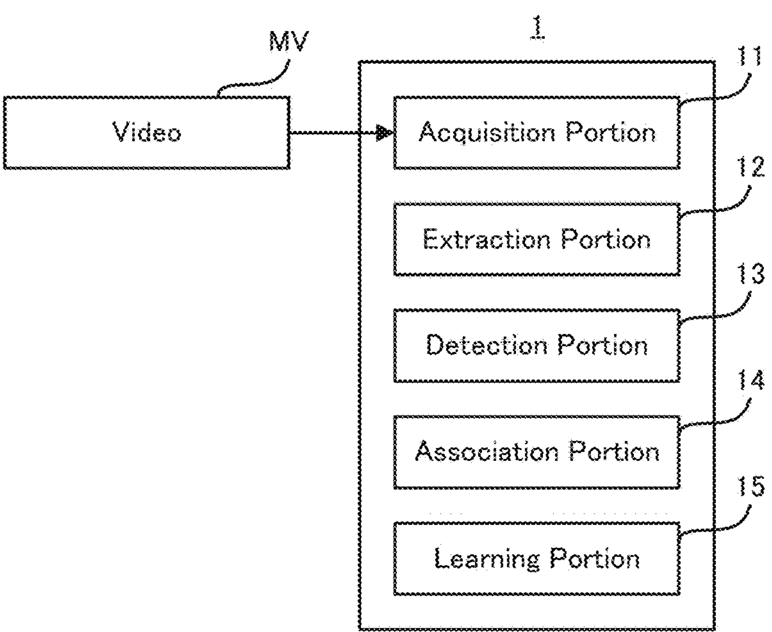
FIG. 1 is a block diagram showing a configuration of a learning apparatus according to a first example embodiment.

In the following descriptions, example embodiments of the learning apparatus, learning method, tracking apparatus, tracking method, and recording medium will be described referring to the drawings.

1: First Example Embodiment

A first example embodiment of the learning method, learning method and recording medium will be described. In the following, the first example embodiment of the learning apparatus, learning method, and recording medium will be described by using a learning apparatus 1 to which the first example embodiment of the learning apparatus, learning method, and recording medium is applied.

[1-1: Configuration of the Learning Apparatus 1]

Referring to FIG. 1, the configuration of the learning apparatus 1 according to the first example embodiment will be described. FIG. 1 is a block diagram showing the configuration of the learning apparatus 1 according to the first example embodiment.

As shown in FIG. 1, the learning apparatus 1 according to the first example embodiment comprises an acquisition portion 11, an extraction portion 12, a detection portion 13, an association portion 14, and a learning portion 15.

The acquisition portion 11 acquires a single video MV. The extraction portion 12 extracts a plurality of sets from a plurality of frames included in the video MV, each of the plurality of sets including a first frame and a second frame different from the first frame. The plurality of sets include: a first set in which the time interval between the first and second frames is a first interval; and a second set in which the time interval between the first and second frames is a second interval different from the first interval.

The detection portion 13 detects an object included in the first frame and the object included in the second frame respectively. The association portion 14 associates the object included in the first frame with the object included in the second frame. The learning position makes the association portion 14 learn an association method for the object on the basis of the association result of the plurality of sets by the association portion 14.

[1-2: Technical Effectiveness of the Learning Apparatus 1]

The learning apparatus 1 in the first example embodiment extracts a plurality of pairs of the first and second frames with various time intervals between the frames. Each of the plurality of pairs may be learning data to be used for learning for association. In other words, the learning apparatus 1 can prepare a lot of pairs which can be used for the learning of association. Since the learning apparatus 1 learns the association method for the object, using a lot of pairs of the first and second frames, it is possible to obtain the association portion 14 that can perform the association for the object with high accuracy.

2: Second Example Embodiment

A second example embodiment of the learning apparatus, learning method and recording medium will be described. In the following, the second example embodiment of the learning apparatus, learning method, and recording medium will be described by using a learning apparatus 2 to which the second example embodiment of the learning apparatus, learning method, and recording medium is applied.

2-1: Configuration of the Learning Apparatus 2

Figure 2:
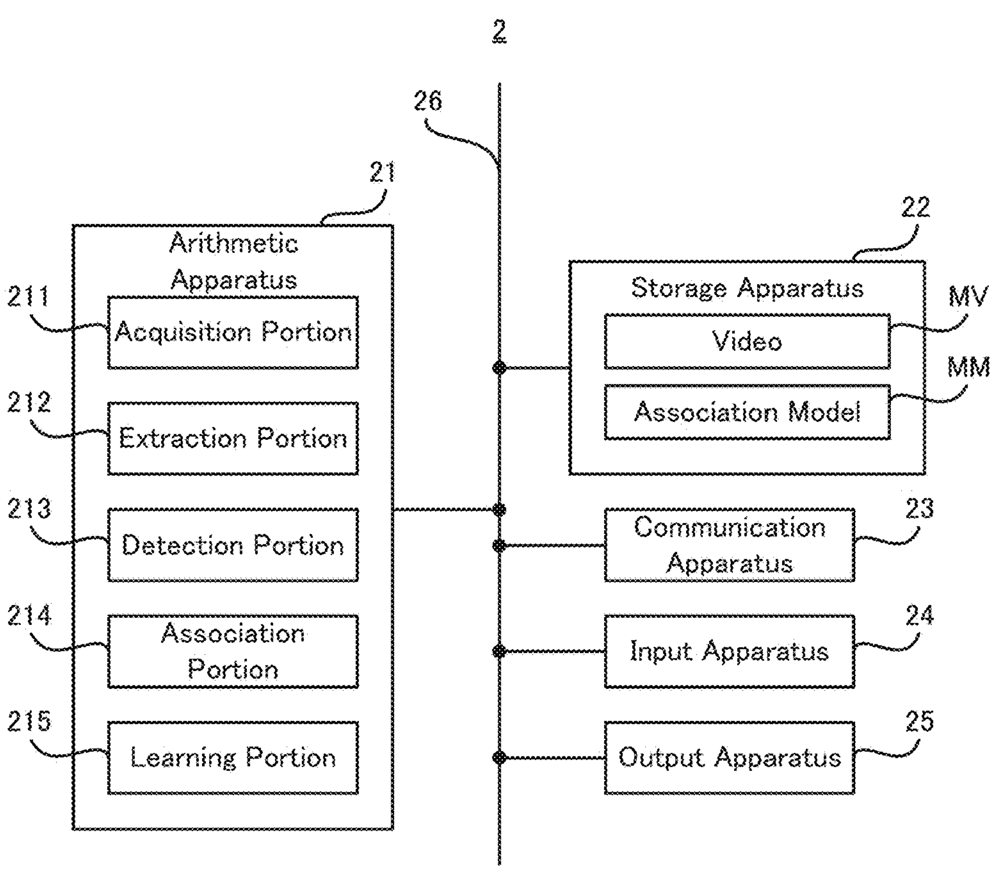
FIG. 2 is a block diagram showing a configuration of a learning apparatus according to a second example embodiment.

Referring to FIG. 2, the configuration of the learning apparatus 2 according to the second example embodiment will be described. FIG. 2 is a block diagram showing the configuration of the learning apparatus 2 according to the second example embodiment.

As shown in FIG. 2, the learning apparatus 2 comprises an arithmetic apparatus 21 and a storage apparatus 22. Furthermore, the learning apparatus 2 may comprise a communication apparatus 23, an input apparatus 24, and an output apparatus 25. However, the learning apparatus 2 may not comprise at least one of the communication apparatus 23, the input apparatus 24, and the output apparatus 25. The arithmetic apparatus 21, the storage apparatus 22, the communication apparatus 23, the input apparatus 24, and the output apparatus 25 may be connected through the data bus 26.

The arithmetic apparatus 21 includes at least one of, for example, CPU (Central Processing Unit), GPU (Graphics Processing Unit), and FPGA (Field Programmable Gate Array). The arithmetic apparatus 21 reads a computer program. For example, the arithmetic apparatus 21 may read a computer program stored in the storage apparatus 22. For example, the arithmetic apparatus 21 may read a computer program stored in a computer-readable and non-transitory recording medium, using a recording medium reading apparatus (not shown) provided by the learning apparatus 2 (e.g., the input apparatus 24, described later). The arithmetic apparatus 21 may acquire (i.e., download or read) via the communication apparatus 23 (or the other communication apparatus), a computer program from a not-shown apparatus disposed outside the learning apparatus 2. The arithmetic apparatus 21 executes the computer program loaded. Consequently, in the arithmetic apparatus 21, logical function blocks for executing operations to be performed by the learning apparatus 2 are realized. In other words, the arithmetic apparatus 21 can function as a controller for realizing the logical function blocks for executing operations (in other words, processing) to be performed by the learning apparatus 2.

In FIG. 2, there is shown an example of the logical function blocks realized in the arithmetic apparatus 21, for performing the learning operation. As shown in FIG. 2, there are realized in the arithmetic apparatus 21, an acquisition portion 211 which is a specific example of the "acquisition unit" described in the after-mentioned supplementary notes, an extraction portion 212 which is a specific example of the "extraction unit" described in the after-mentioned supplementary notes, a detection portion 213 which is a specific example of the "detection unit" described in the after-mentioned supplementary notes, an association portion 214 which is a specific example of the "association unit" described in the after-mentioned supplementary notes, and a learning portion 215 which is a specific example of the "learning unit" described in the after-mentioned supplementary notes.

The storage apparatus 22 is capable of storing desired data. For example, the storage apparatus 22 may temporarily store computer programs that are executed by the arithmetic apparatus 21. The storage apparatus 22 may temporarily store data that is temporarily used by the arithmetic apparatus 21 when the arithmetic apparatus 21 is running a computer program. The storage apparatus 22 may store data that the learning apparatus 2 holds in the long term. The storage apparatus 22 may include at least one of a RAM (Random Access Memory), a ROM (Read Only Memory,) a hard-disk apparatus, a magneto-optical disk apparatus, an SSD (Solid State Drive) and a disk-array apparatus. That is, the storage apparatus 22 may include a non-transitory recording medium.

The storage apparatus 22 may store a plurality of video MV. The video MV may be an image containing a plurality of frames. The video MV may be used for the learning operation by the learning apparatus 2. However, the storage apparatus 22 does not need to store the video MV.

The communication portion 23 can communicate with apparatuses outside of the learning apparatus 2 through a communication network (not shown).

The input apparatus 24 is an apparatus that accepts information inputted to the learning apparatus 2 from the outside of the learning apparatus 2. For example, the input apparatus 24 may include an operating apparatus operable by an operator of the learning apparatus 2 (e.g., at least one of a keyboard, a mouse, and a touch panel). For example, the input apparatus 24 may include a read apparatus that can read information stored in an external recording medium to the learning apparatus 2.

The output apparatus 25 is an apparatus that outputs information to the outside of the learning apparatus 2. For example, the output apparatus 25 may output information as an image. In other words, the output apparatus 25 may include a display apparatus (so-called a display) that is capable of displaying an image indicating information to be outputted. For example, the output apparatus 25 may output information as sound. That is, the output apparatus 25 may include an audio apparatus (so-called a speaker) capable of outputting sound. For example, the output apparatus 25 may output information to the paper surface. In other words, the output apparatus may include a print apparatus (so-called printer) that can print desired information on the paper surface.

2-2: Learning Operation Performed by the Learning Apparatus 2

Figure 3:
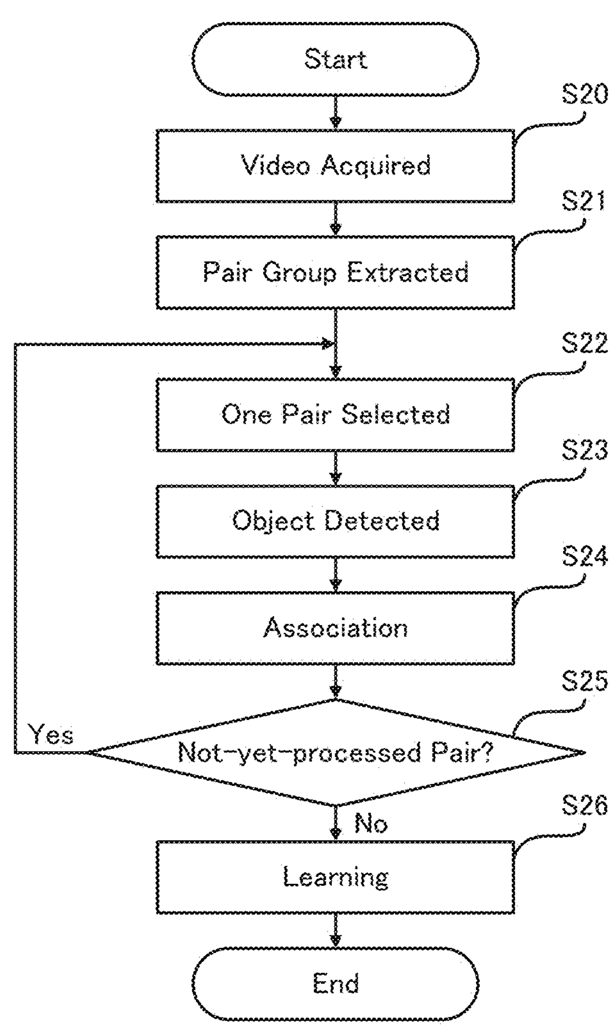
FIG. 3 is a flow chart showing a flow of a learning operation performed by the learning apparatus according to the second example embodiment.

Referring to FIG. 3, a flow of the learning operation performed by the learning apparatus 2 in the second example embodiment will be described. FIG. 3 is a flow chart showing a flow of the learning operation that is performed by the learning apparatus 2 in the second example embodiment. The learning operation performed by the learning apparatus 2 may be performed offline.

As shown in FIG. 3, the acquisition portion 211 acquires a single video MV (step S20). The extraction portion 212 extracts a pair group from a plurality of frames included in the video MV (step S21). A single pair may include a first frame and a second frame different from the first frame. The extraction portion 212 extracts a plurality of pairs of the first frame and the second frame different from the first frame, from the plurality of frames included in the video MV. The plurality of pairs include: a first pair in which the time interval between the first and second frames is a first interval; and a second pair in which the time interval between the first and second frames is a second interval different from the first interval. Here, the first frame included in the first pair and the first frame included in the second pair may be different from each other. Further, the second frame included in the first pair and the second frame included in the second pair may be different from each other. The extraction portion 212 may generate the pair by selecting any two frames out of all frames included in the single video MV. The extraction portion 212 may extract the batch-number of pairs, using all frames included in the single video MV. The batch-number may be, for example, 1024 or more. The batch-number is not particularly limited, any value can be applied.

The extraction portion 212 selects one pair out of the pair group extracted (step S22). The extraction portion 212 selects the pair of the first and second frames among the plurality of pairs extracted.

The detection portion 213 detects an object included in the first frame and the object included in the second frame respectively (step S23). The association portion 214 associates the object included in the first frame with the object included in the second frame by using the association model MM that is learnable (step S24).

The association model MM may be, for example, a model capable of outputting information on the association result with respect to the object included in the first frame and the object included in the second frame, when information on the object included in the first frame and information on the object included in the second frame are inputted thereto. The association model MM is typically a model using a neural network, but may be a model different from the model using the neural network.

Alternatively, the association model MM may be, for example, a model capable of outputting information on the association result with respect to the object included in the first frame and the object included in the second frame, when the first frame and the second frame are inputted thereto. That is, the associated model MM may be a model that detects each of the object included in the first frame and the object included in the second frame, and associates the object included in the first frame with the object included in the second frame. In this case, the detection portion 213 may detect the objects included in the first and second frames respectively by using the association model MM, and the association portion 214 may associate the object included in the first frame with the object included in the second frame by using the learnable association model MM. Alternatively, the arithmetic apparatus 21 may include a logical processing block where the detection portion 213 and the association portion 214 are integrated.

The extraction portion 212 determines whether there is within the plurality of pairs of the first and second frames, a pair to which processing from steps S22 to S24 is not yet processed (step S25). When there is the pair not-yet-processed (step S25: Yes), the flow goes to step S22.

When the processing from steps S22 to S24 is performed with respect to all of the pairs (step S25: No), the learning portion 215 makes the association portion 214 learn the association method for the object on the basis of the association result by the association portion 214 with respect to the plurality of pairs (step S26).

Specifically, the learning portion 215 may make the association model MM to be used by the association portion 214 learn the association method for the object and construct the association model MM. More specifically, the learning portion 215 may adjust parameters defining operations of the association model MM. When the association model MM is a neural network, the parameters defining the operations of the association model MM may include at least one of the weight and bias of the neural network. The learning portion 215 may acquire the single video MV and update the parameters defining the operations of the association model MM on the basis of the association result with respect to the batch-number of pairs. The parameters defining the operations of the association modeled MM may be, for example, the weight or bias of the neural network. The parameters defining the operations of the association model MM may be stored in the storage apparatus 22.

The learning portion 215 may calculate the learning loss based on the association result to make the association model MM learn the association method using the learning loss. The learning portion 215 may make the association model MM perform the contrastive learning. The learning portion 215 may calculate a loss function such as a cross-entropy loss of an object between frames and make the association model MM learn the association method so that the contrastive loss becomes smaller (typically, is minimized).

The learning apparatus 2 may construct by the learning operations, the association model MM that can be used for on-line Multi-Object Tacking.

2-3: Extraction Example for the First Pair

Figure 4:
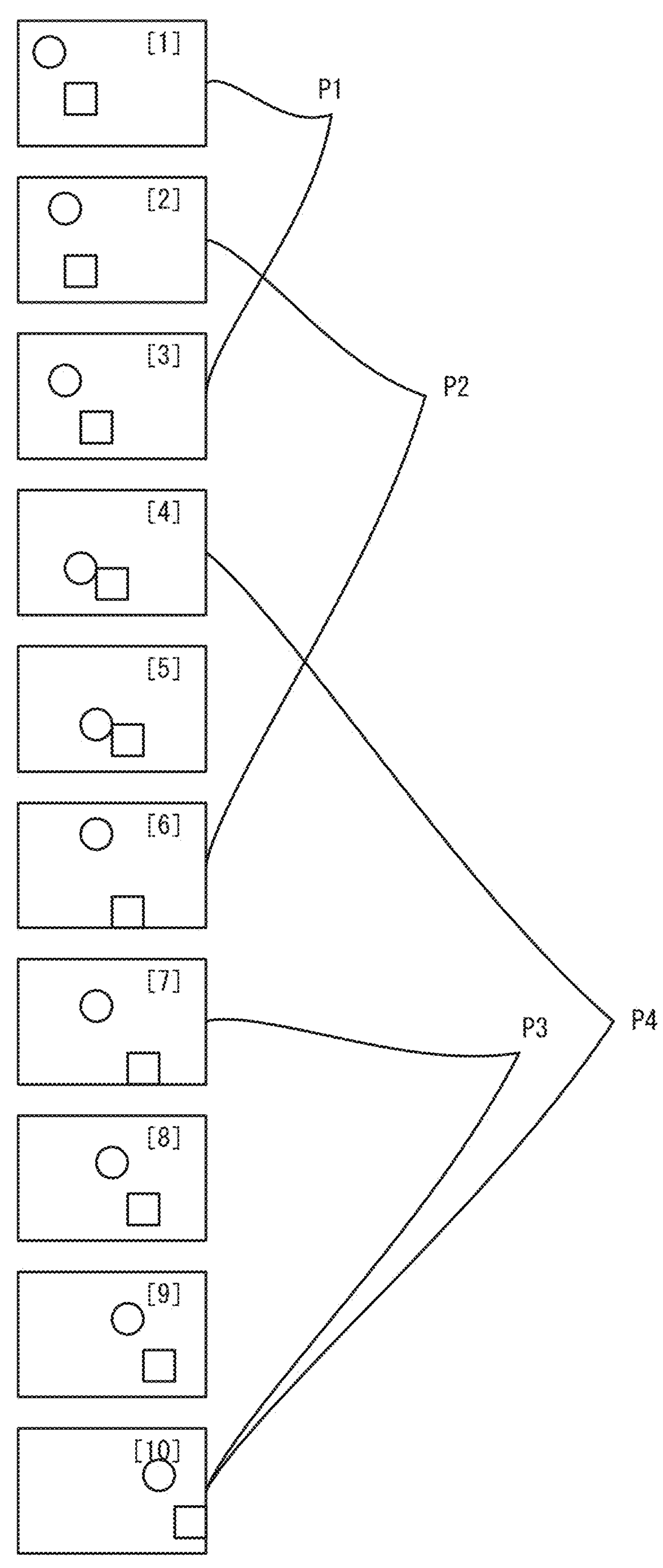
FIG. 4 is a conceptual diagram showing an extraction example for a first pair.

FIG. 4 shows an extraction example for the first pair by the extraction portion 212. The extraction portion 212 may select randomly from the plurality of frames, the first frame and the second frame to extract the pair.

FIG. 4 shows frames [1] to which are included in a single video MV. The Frames [1] to may be successive frames. For example, the next frame of the frame [1] may be the frame [2], and the next frame of the frame [2] may be the frame [3].

For example, as shown in FIG. 4, the extraction portion 212 may randomly select the frame [1] as the first frame and randomly select the frame [3] as the second frame to extract randomly a pair P1. Also, the extraction portion 212 may randomly select the frame [2] as the first frame and randomly select the frame [6] as the second frame to extract randomly a pair P2. In addition, the extraction portion 212 may randomly select the frame [7] as the first frame and randomly select the frame as the second frame to extract randomly a pair P3. In addition, the extraction portion 212 may randomly select the frame [4] as the first frame and randomly select the frame [10] as the second frame to extract randomly a pair P4.

Further, for example, the pair of the frame [1] and the frame [3] may be referred to as a "forward pair", and the pair of the frame [3] and the frame [1] may be referred to as a "reverse pair", so that each pair is distinguished as another pair.

2-4: An Extraction Example for the Second Pair

Figure 5:
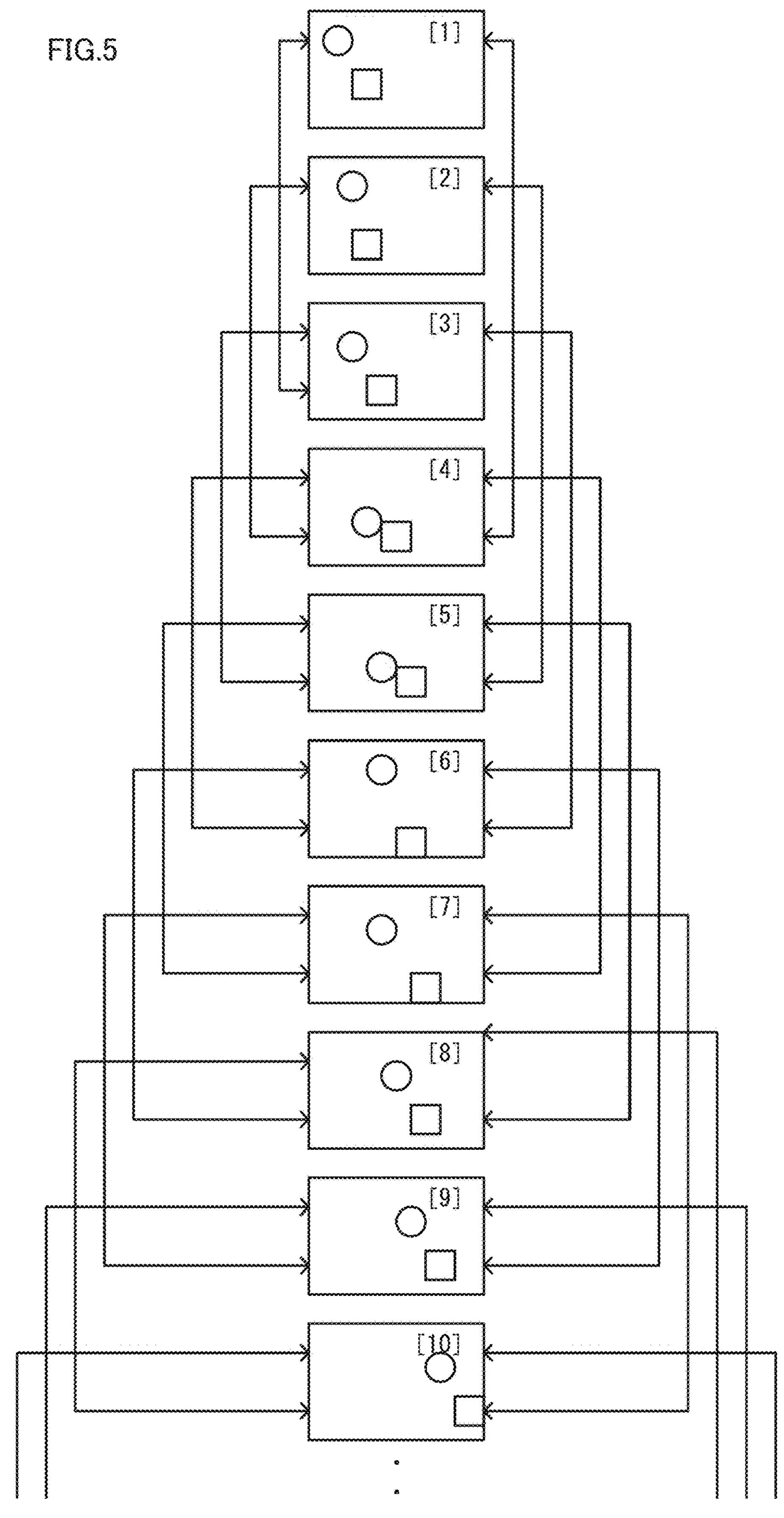
FIG. 5 is a conceptual diagram of an extraction example for a second pair.

FIG. 5 shows an extraction example for the second pair by the extraction portion 212. The extraction portion 212 may extract a set by selecting as the second frame, a frame existing the predetermined number of frames forward or backward from the first frame.

FIG. 5 also shows the frames [1] to which are included in the single video MV. The frames [1] to may be successive frames.

As shown on the left side of the frames [1] to shown in FIG. 5, a set may be extracted by selecting as the second frame, a frame existing two-frame forward or backward from the first frame. Thus, selecting the frame existing two-frame forward or backward as the second frame may be referred to as "selecting the frame with a skip width of 1". Further, as shown on the right side of the frames [1] to shown in FIG. 5, a pair may be extracted by selecting as the second frame, a frame existing three-frame forward or backward from the first frame. Thus, selecting the frame existing three-frame forward or backward as the second frame may be referred to as "selecting the frame with a skip width of 2". In FIG. 5, the skip width of 1 and the skip width of 2 are shown as an example, the skip width may be set to any number. The skip width of frames may be determined automatically or specified manually.

Figure 6:
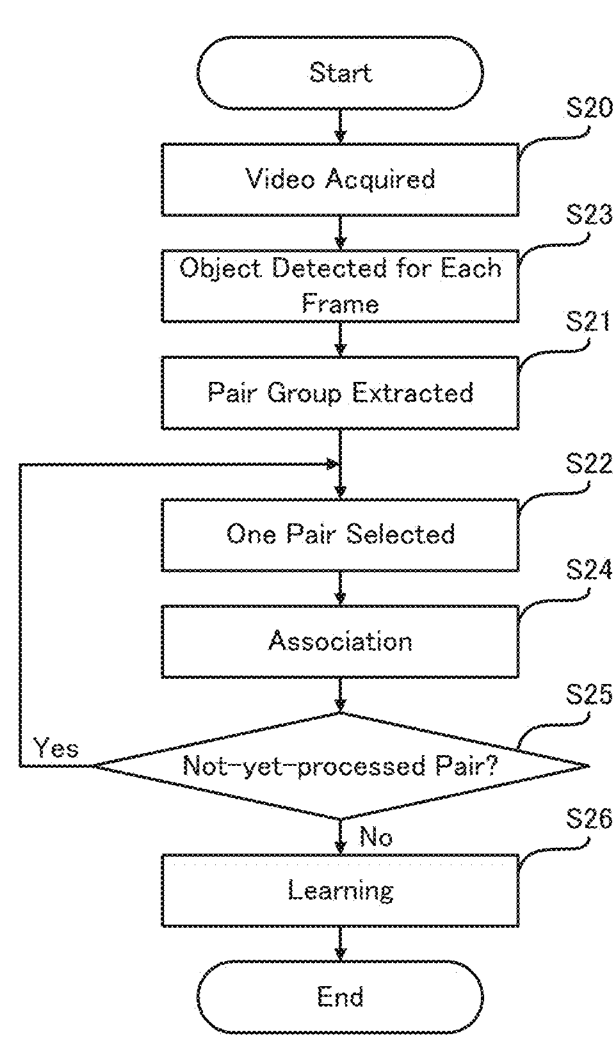
FIG. 6 is a flow chart showing a flow of a variation of the learning operation to be performed by the learning apparatus according to the second example embodiment.

As shown in FIG. 6, the object detection operation by the detection portion 213 in step S23 may be performed prior to the pair extraction by the extraction portion 212. The extraction portion 212 may extract pairs different from each other by selecting the same frames as each other. Therefore, with respect to the frames included in the single video MV acquired by the acquisition portion 211, the detection portion 213 may perform detection of the object prior to the pair extraction by the extraction portion 212.

2-5: Technical Effectiveness of the Learning Apparatus 2

The learning apparatus 2 in the second example embodiment extracts the set by randomly selecting the first frame and the second frame from the plurality of frames, and/or extracts the set by selecting as the second frame, the frame existing a predetermined number of frames forward or backward from the first frame. Thereby, it is possible to generate more pairings of various frames easily. Since the learning apparatus 2 uses the pairings of various frames, it is possible to provide accurately and efficiently learning of the association method, and possible to construct the association model MM which can perform the association accurately. In addition, since the learning apparatus 2 calculates the learning loss based on the association result, and makes the association portion 214 learn the association method using the learning loss, the accuracy of the association can be improved.

For example, a learning apparatus of the comparative example 1, which learns on-line using a small number of frames of about one to ten, performs the learning using a small number of pairs. Consequently, the accuracy of the association between objects tends to decrease. The learning apparatus 2 according to the second example embodiment learns using all frames included in a video. Consequently, the accuracy of the association between objects is higher than that of the learning apparatus according to the comparative example 1.

In addition, the learning apparatus of Comparative Example 2, which performs offline learning by converting all frames included in a plurality of videos into the batch, transforms the plurality of videos to arrays. Then, it is necessary to sord out and align the number of frames. Therefore, the calculation cost is high. In addition, the association model learned by the learning apparatus of the comparative example 2 operates offline using all frames included in the video. In contrast, the learning apparatus 2 according to the second example embodiment converts only frames included in a single video into the batch. Therefore, the calculation cost can be reduced. In contrast, the association model MM in the second example embodiment does not have processing depending on the number of frames included in a single video.

In addition, the association model MM constructed by the learning apparatus 2 in the second example embodiment can improve the accuracy of the on-line object tracking model.

3: Third Example Embodiment

A third example embodiment of the learning apparatus, learning method and recording medium will be described. In the following, the third example embodiment of the learning apparatus, learning method, and recording medium will be described by using a learning apparatus 3 to which the third example embodiment of the learning apparatus, learning method, and recording medium is applied.

The learning apparatus 3 according to the third example embodiment comprises the arithmetic apparatus 21 and the storage apparatus 22, similarly to the learning apparatus 2 according to the second example embodiment. Furthermore, the learning apparatus 3 may comprise the communication apparatus 23, the input apparatus 24, and the output apparatus 25, similarly to the learning apparatus 2. However, the learning apparatus 3 may not include at least one of the communication apparatus 23, the input apparatus 24, and the output apparatus 25. The learning apparatus 3 according to the third example embodiment differs from the learning apparatus 2 according to the second example embodiment in the learning operation performed by the learning portion 215. The other features of the learning apparatus 3 may be identical to the other features of the learning apparatus 2.

3-1: Learning Operation Performed by the Learning Apparatus 3

Figure 7:
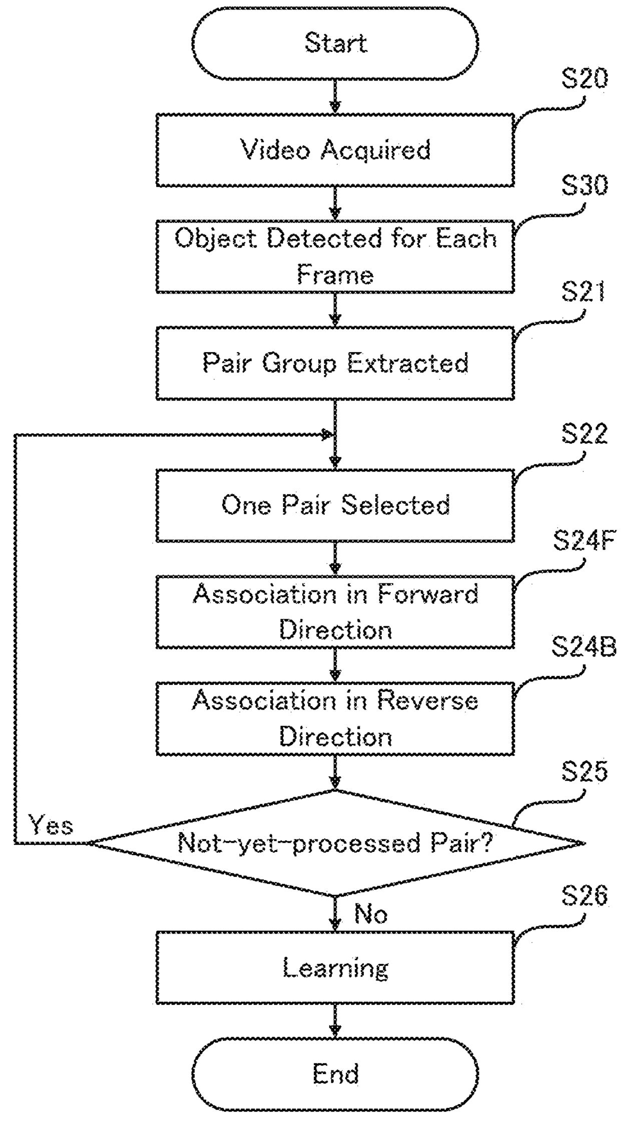
FIG. 7 is a flow chart showing a flow of the learning operation to be performed by the learning apparatus according to the third example embodiment.

FIG. 7 is a flow chart showing a flow of a learning operation that is performed by the learning apparatus 3 according to the third example embodiment. As shown in FIG. 7, the acquisition portion 211 acquires a single video MV (Step S20).

The detection portion 213 detects the object included each frame of the single video MV acquired by acquisition portion 211. The detection portion 213 may detect the object in the forward direction, for example (step S30). The detection portion 213 may detect the object in the order of imaging of the frames, which are included in the video. For example, when the video MV includes the frames [1] to [10], the detection portion 213 may first detect the object included in the frame [1], then detect the object included in the frame [2], then detect the object included in the frame [3], . . . , and finally detect the object included in the frame [10].

The detection portion 213 may detect the object in the reverse direction instead of the detection of the object in the forward direction. In this case, the detection portion 213 may detect the object in the reverse order of imaging of the frames, which are included in the video MV. For example, when the video MV includes the frames [1] to [10], the detection portion 213 may first detect the object included in the frame [10], then detect the object included in the frame [9], then detect the object included in the frame [8], . . . , and finally detect the object included in the frame [1].

The extraction portion 212 extracts from the plurality of frames included in the video MV, the plurality of pairs, each pair having the first frame and the second frame which differs from the first frame (step S21).

3-2: Example of Generating Pair

Figure 8:
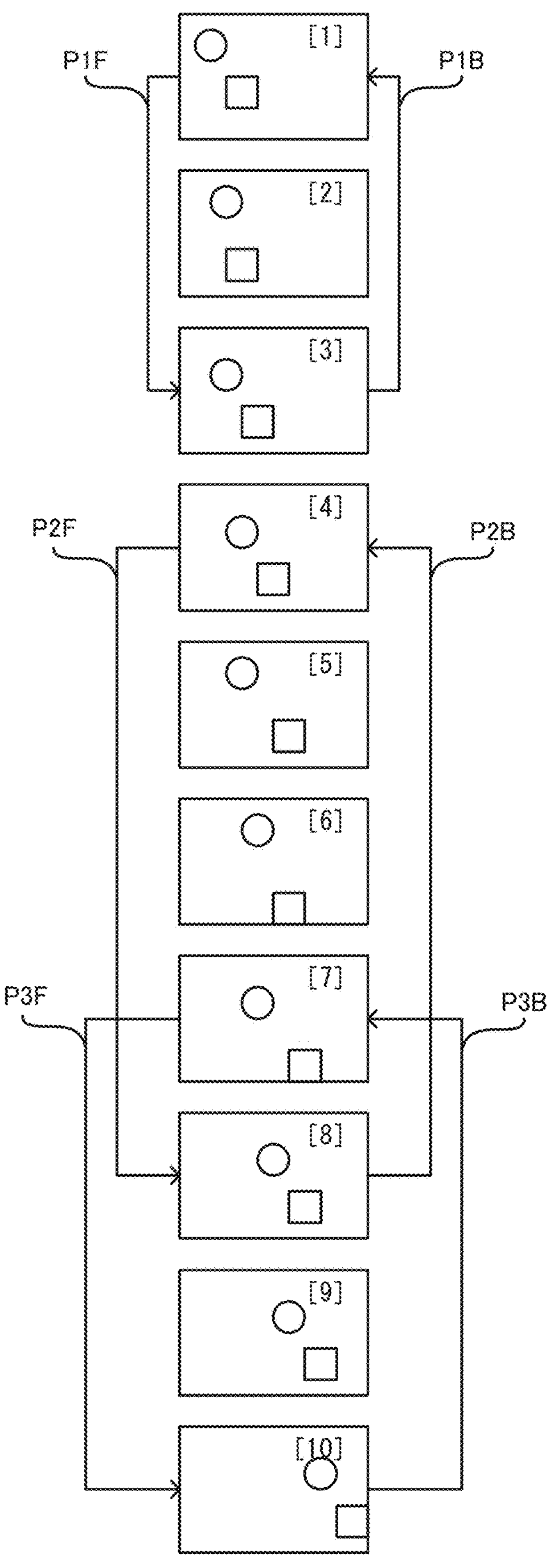
FIG. 8 is a conceptual diagram showing a forward pair and a reverse pair.

Referring to FIG. 8, a flow of a pair-extracting operation performed by the learning apparatus 3 according to the third example embodiment will be described. As shown in FIG. 8, in the third example embodiment, for example, the frame [1] and the frame [3] may be extracted as a first forward pair P1F, and the frame [3] and the frame [1] may be extracted as a first reverse pair P1B. The first forward pair P1F and the first reverse pair P1B may be distinguished as a different pair from each other. Similarly, for example, the frame [4] and the frame [8] may be extracted as a second forward pair P2F, and the frame [8] and the frame [4] may be extracted as a second reverse pair P2B. The second forward pair P2F and the second reverse pair P2B may be distinguished as a different pair from each other. For example, the frame [7] and the frame may be extracted as a third forward pair P3F, and the frame and the frame [7] may be extracted as a third reverse pair P3B. The third forward pair P3F and the third reverse pair P3B may be distinguished as a different pair from each other.

The extraction portion 212 selects one pair of the plurality of pairs extracted, each pair having the first and second frames (step S22). The extraction portion 212 selects one pair of the first and second frames from the pair group extracted. The association portion 214 performs association in the forward direction (step S24F). The association portion 214 associates the object included in the second frame with the object included in the first frame. The association portion 214 performs association in the reverse direction (step S24B). The association portion 214 associates the object included in the first frame with the object included in the second frame.

The extraction portion 212 determines whether there is within the extracted pair group, a pair for which the processing of steps S22, S24F, and S24B is not performed (step S25). When there is the pair (step S25: Yes), the flow goes to step S22.

With respect to all pairs, the processing of steps S22 and S24 has been performed (step S25: No), the learning portion 215 makes the association portion 214 learn the association method for the object, based on the association results by the association portion 214 with respect to the plurality of sets (step S26).

The learning portion 215 may make the association portion 214 learn the association method for the object on the basis of: a forward-direction association result in which the object included in the second frame existing after the first frame is associated with the object included in the first frame; and a reverse-direction association result in which the object included in the first frame existing before the second frame is associated with the object included in the second frame.

Figure 9A:
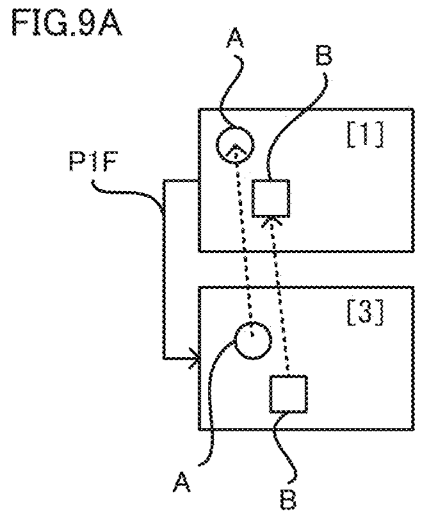
FIG. 9A is a conceptual diagram showing the learning operation performed by the learning apparatus according to the third example embodiment.
Figure 9B:
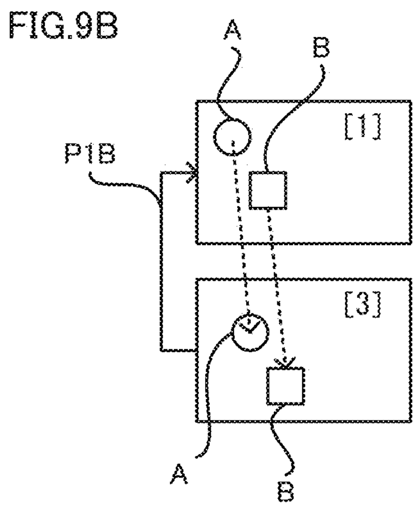
FIG. 9B is a conceptual diagram showing the learning operation performed by the learning apparatus according to the third example embodiment.

FIG. 9A to FIG. 9D is a conceptual diagram of the forward-direction association result and the reverse-direction association result. FIG. 9A shows the forward-direction association result in which the objects included in the frame [3] as the second frame existing after the frame [1] as the first frame, are associated with the objects included in the frame [1]. FIG. 9B shows the reverse-direction association result in which the objects included in the frame [1] as the first frame existing before the frame [3] as the second frame, are associated with the objects included in the frame [3].

In the example case shown in FIG. 9A to FIG. 9D, each frame includes two types of objects. FIG. 9A exemplifying the forward-direction association result, shows by an example that the association portion 214 has associated the object A in the frame [3] with the object A in the frame [1]. Further, FIG. 9A shows by an example that the association portion 214 has associated the object B in the frame [3] with the object B in the frame [1].

On the other hand, FIG. 9A exemplifying the reverse-direction association result, shows by an example that the association portion 214 has associated the object A in the frame [1] with the object A in the frame [3]. Further, FIG. 9A shows by an example that the association portion 214 has associated the object B in the frame [1] with the object B in the frame [3].

When the forward-direction association result exemplified in FIG. 9A and the reverse-direction association result exemplified in FIG. 9B are compared to each other, the association portion 214 performs the same association in the forward-direction association and in the reverse-direction association.

Figure 9C:
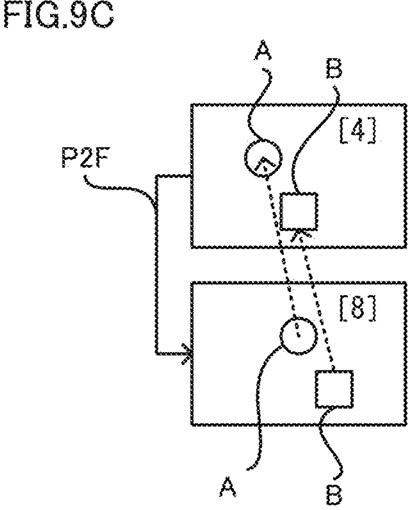
FIG. 9C is a conceptual diagram showing the learning operation performed by the learning apparatus according to the third example embodiment.
Figure 9D:
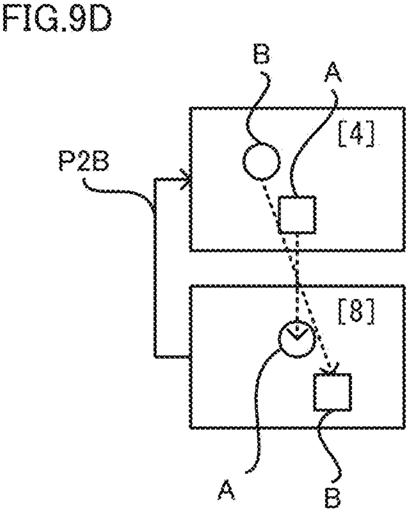
FIG. 9D is a conceptual diagram showing the learning operation performed by the learning apparatus according to the third example embodiment.

Further, FIG. 9C shows the forward-direction association result in which the objects included in the frame [8] as the second frame existing after the frame [4] as the first frame, are associated with the objects included in the frame [4]. FIG. 9D shows the reverse-direction association result in which the objects included in the frame [4] as the first frame existing before the frame [8] as the second frame, are associated with the objects included in the frame [8].

FIG. 9C exemplifying the forward-direction association result, shows by an example that the association portion 214 has associated the object A in the frame [8] with the object A in the frame [4]. Further, FIG. 9C shows by an example that the association portion 214 has associated the object B in the frame [8] with the object B in the frame [4].

On the other hand, FIG. 9D exemplifying the reverse-direction association result, shows by an example that the association portion 214 has associated the object A in the frame [4] with the object A in the frame [8]. Further, FIG. 9D shows by an example that the association portion 214 has associated the object B in the frame [4] with the object B in the frame [8].

When the forward-direction association result exemplified in FIG. 9C and the reverse-direction association result exemplified in FIG. 9D are compared to each other, the association portion 214 performs the different association between the forward-direction association and the reverse-direction association result.

The learning portion 215 may make the association portion 214 learn the association method for the object on the basis of the loss function in which the loss increases according to increase of a degree that the forward-direction association result is not similar to the reverse-direction association result. For example, in the case shown in FIG. 9A to FIG. 9D, the forward-direction association result shown in FIG. 9A is similar to the reverse-direction association result shown in FIG. 9B. Therefore, the loss of the loss function may decrease. Further, the forward-direction association result shown in FIG. 9C is not similar to the reverse-direction association result shown in FIG. 9D. Therefore, the loss of the loss function may increase.

The learning apparatus 3 may perform the association of the object in the forward direction and also in the reverse direction, and may perform the learning so that the error of both of the association results is small. In other words, the learning apparatus 3 may perform the unsupervised learning.

3-3: Technical Effectiveness of the Learning Apparatus 3

The learning apparatus 3 according to the third example embodiment makes the association portion 214 learning the association method of the object on the basis of: the forward-direction association result in which the object included in the second frame is associated with the object included in the first frame existing before the second frame; and the reverse-direction association result in which the object included in the first frame is associated with the object included in the second frame existing after the first frame. Therefore, the learning can be performed without preparing correct data. That is, the learning apparatus 3 can use an algorithm of the unsupervised learning.

Since the learning apparatus 3 first performs the detection processing for each frame, it is possible to reduce the detection processing for the frames overlapping in the extracted pair group, which reduces the calculation cost. In addition, since the learning apparatus 3 adds pairs with the association of the reverse direction, the number of pairs that can be used for the learning can be efficiently increased.

In addition, since the learning apparatus 3 makes the association portion 214 learn the association method for the object on the basis of the loss function in which the loss increases according to increase of a degree that the forward-direction association result is not similar to the reverse-direction association result, it is possible to improve the accuracy of the association of the object.

4: Fourth Example Embodiment

A fourth example embodiment of the learning apparatus, learning method and recording medium will be described. In the following, the fourth example embodiment of the learning apparatus, learning method, and recording medium will be described by using a learning apparatus 4 to which the fourth example embodiment of the learning apparatus, learning method, and recording medium is applied.

The learning apparatus 4 according to the fourth example embodiment comprises the arithmetic apparatus 21 and the storage apparatus 22, similarly to the learning apparatus 3 according to the third example embodiment. Furthermore, the learning apparatus 4 may comprise the communication apparatus 23, the input apparatus 24, and the output apparatus 25, similarly to the learning apparatus 3. However, the learning apparatus 4 may not include at least one of the communication apparatus 23, the input apparatus 24, and the output apparatus 25. The learning apparatus 4 according to the fourth example embodiment differs from the learning apparatus 3 according to the third example embodiment in the detection operation performed by the detection portion 213 and the learning operation performed by the learning portion 215. The other features of the learning apparatus 4 may be identical to the other features of the learning apparatus 3.

4-1: Learning Operation Performed by the Learning Apparatus 4

In the fourth example embodiment, in steps S30 and S31 shown in FIG. 7, the detection portion 213 detects the object and the position thereof included in the first frame and the object and the position thereof included in the second frame respectively. The detection portion 213 may detect the objects and the positions thereof included in the frames included in the single video MV acquired by the acquisition portion 211 respectively. The detection portion 213 may detect the objects and the positions thereof in the forward direction (step S30), for example. The detection portion 213 may detect the objects and the positions thereof in the reverse direction.

In the fourth example embodiment, in step S32 shown in FIG. 7, the learning portion 215 makes the association portion 214 learn the association method for the object based on at least one of the comparison results: the first comparison result between the position where the first object is included in the first frame in the forward-direction association result and the position where the first object is included in the first frame in the reverse-direction association result; and the second comparison result between the position where the second object is included in the second frame in the forward-direction association result and the position where the second object is included in the second frame in the reverse-direction association result.

Figures 10A, 10B, 10C, 10D, 10E, 10F, 11A, 11B, 11C, 11D:
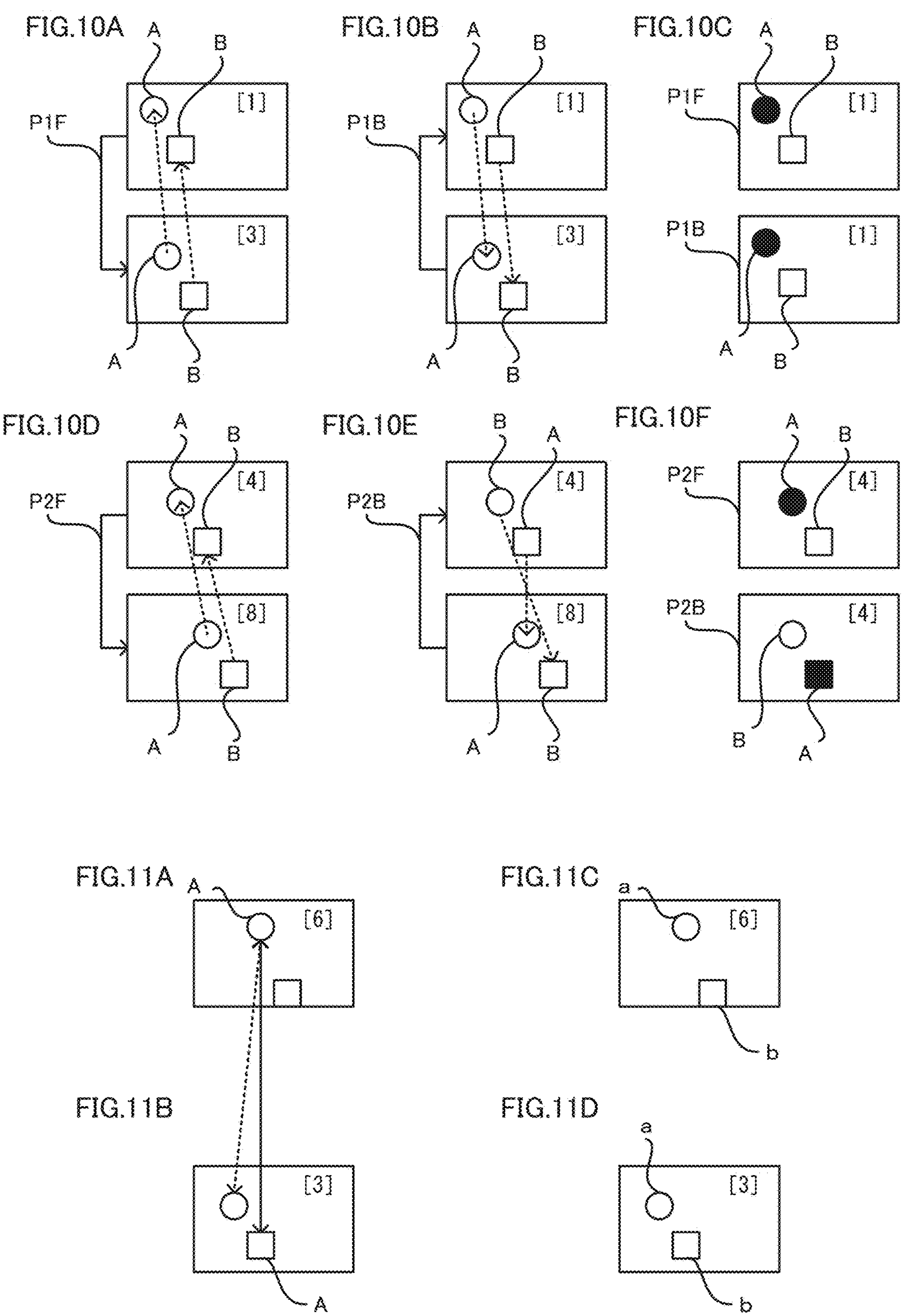
FIG. 10A is a conceptual diagram showing the learning operation performed by the learning apparatus according to the fourth example embodiment.
FIG. 10B is a conceptual diagram showing the learning operation performed by the learning apparatus according to the fourth example embodiment.
FIG. 10C is a conceptual diagram showing the learning operation performed by the learning apparatus according to the fourth example embodiment.
FIG. 10D is a conceptual diagram showing the learning operation performed by the learning apparatus according to the fourth example embodiment.
FIG. 10E is a conceptual diagram showing the learning operation performed by the learning apparatus according to the fourth example embodiment.
FIG. 10F is a conceptual diagram showing the learning operation performed by the learning apparatus according to the fourth example embodiment.
FIG. 11A is a conceptual diagram showing the learning operation performed by the learning apparatus according to the fifth example embodiment.
FIG. 11B is a conceptual diagram showing the learning operation performed by the learning apparatus according to the fifth example embodiment.
FIG. 11C is a conceptual diagram showing the learning operation performed by the learning apparatus according to the fifth example embodiment.
FIG. 11D is a conceptual diagram showing the learning operation performed by the learning apparatus according to the fifth example embodiment.

FIG. 10A to FIG. 10F is a conceptual diagram showing the forward-direction association result and the reverse-direction association result, similarly to FIG. 9A to FIG. 9D. FIG. 10A shows the forward-direction association result in which the object included in the frame [3] existing after the frame [1] is associated with the object included in the frame [1]. FIG. 10B shows the reverse-direction association result in which the object included in the frame [1] existing before the frame [3] is associated with the object included in the frame [3].

FIG. 10A exemplifying the forward-direction association result shows that the association portion 214 associates the object A in the frame [3] with the object A in the frame [1]. Further, FIG. 10A shows that the association portion 214 associates the object B in the frame [3] with the object B in the frame [1].

On the other hand, FIG. 10B exemplifying the reverse-direction association result shows that the association portion 214 associates the object A in the frame [1] with the object A in the frame [3]. Further, FIG. 10B shows that the association portion 214 associates the object B in the frame [1] with the object B in the frame [3].

As shown in FIG. 10C, the learning portion 215 may make the association portion 214 learn the association method for the object on the basis of the comparison result between: the positions where the objects A and B as the first objects are included in the frame [1] of the forward pair P1F as the first frame in the forward-direction association result respectively; and the positions where the objects A and B are included in the frame [1] of the reverse pair P1B in the reverse-direction association result respectively.

The learning portion 215 determines whether the result of the forward direction association by the association portion 214 coincides with the result of the reverse direction association. For example, as shown in FIG. 10C, the learning portion 215 may determine whether the result of the forward direction association by the association portion 214 coincides with the result of the reverse direction association, on the basis of whether the positions where the objects A and B are included in the frame [1] of the forward pair P1F is the same as the positions where the objects A and B are included in the frame [1] of the reverse pair P1B respectively. In the case shown in FIG. 10C, since the positions where the objects A and B are included in the frame [1] of the forward pair P1F is the same as the positions where the objects A and B are included in the frame [1] of the reverse pair P1B respectively, the learning portion 215 may determine that the association by the association portion 214 is successful.

Further, FIG. 10D shows the forward-direction association result in which the objects included in the frame [8] existing after the frame [4] are associated with the objects included in the frame [4]. FIG. 10E shows the reverse-direction association result in which the objects included in the frame [4] existing before the frame [8] are associated with the object included in the frame [8].

FIG. 10D exemplifying the forward-direction association result shows that the association portion 214 has associated the object A in the frame [8] with the object A in the frame [4]. Further, FIG. 10D shows that the association portion 214 has associated the object B in the frame [8] with the object B in the frame [4].

On the other hand, FIG. 10E exemplifying the reverse-direction association result shows that the association portion 214 has associated the object A in the frame [4] with the object A in the frame [8]. Further, FIG. 10E shows that the association portion 214 has associated the object B in the frame [4] with the object B in the frame [8].

As shown in FIG. 10F, the learning portion 215 may make the association portion 214 learn the association method for objects based on the comparison result between: the positions where the objects A and B are included in the frame [4] of the forward pair P2F in the association result of the forward pair P2F respectively; and the positions where the objects A and B are included in the frame [4] of the reverse pair P2B in the association result of the reverse pair P2B respectively.

For example, as shown in FIG. 10F, the learning portion 215 may determine whether the result of the forward direction association by the association portion 214 coincides with the result of the reverse direction association, on the basis of whether the positions where the objects A and B are included in the frame [4] of the forward pair P1F is the same as the positions where the objects A and B are included in the frame [4] of the reverse pair P1B respectively. In the case shown in FIG. 10F, since the positions where the objects A and B are included in the frame [4] of the forward pair P1F is different from the positions where the objects A and B are included in the frame [4] of the reverse pair P1B respectively, the learning portion 215 may determine that the association by the association portion 214 is failed.

The learning portion 215 may make the association portion 214 learn the association method for the object so that the overlap increases between: the position where the first object is included in the first frame in the forward-direction association result; and the position where the first object is included in the first frame in the reverse-direction association result.

4-3: Technical Effectiveness of the Learning Apparatus 4

The learning apparatus 4 in the fourth example embodiment makes the association portion 214 learn the association method for the object, based on at least one of the comparison results: the first comparison result between the position where the first object is included in the first frame in the forward-direction association result and the position where the first object is included in the first frame in the reverse-direction association direction; and the second comparison result between the position where the second object is included in the second frame in the forward-direction association result and the position where the second object is included in the second frame in the reverse-direction association result. Therefore, the learning apparatus 4 can make the association portion 214 learn without preparing the correct answer data. That is, the learning apparatus 4 can use an algorithm of the unsupervised learning. Further, since the learning apparatus 4 performs the association using position information of the object, the association of the object can be performed with higher accuracy compared to a case in which the position information of the object is not used.

In addition to the effectiveness of the learning apparatus 3, according to the learning apparatus 4 in the fourth example embodiment, by using the coincident degree between the results of the forward association and reverse association, the consistency of the tracking results can be more reflected on the learning. Therefore, the accuracy of the association can be further improved.

5: Fifth Example Embodiment

A fifth example embodiment of the learning apparatus, learning method and recording medium will be described. In the following, the fifth example embodiment of the learning apparatus, learning method, and recording medium will be described by using a learning apparatus to which the fifth example embodiment of the learning apparatus, learning method, and recording medium is applied.

The learning apparatus 5 according to the fifth example embodiment comprises the arithmetic apparatus 21 and the storage apparatus 22, similarly to at least one of learning apparatuses: from the learning apparatus 2 in the second example embodiment to the learning apparatus 4 in the fourth example embodiment. Furthermore, the learning apparatus 5 may comprise the communication apparatus 23, the input apparatus 24, and the output apparatus 25, similarly to at least one of learning apparatuses: from the learning apparatus 2 in the second example embodiment to the learning apparatus 4 in the fourth example embodiment. However, the learning apparatus 5 may not include at least one of the communication apparatus 23, the input apparatus 24, and the output apparatus 25. The learning apparatus 5 according to the fifth example embodiment differs from at least one of the learning apparatuses: from the learning apparatus 2 in the second example embodiment to the learning apparatus 4 in the fourth example embodiment in information included in the video MV acquired by acquisition portion 211 and a learning operation performed by the learning portion 215. The other features of the learning apparatus 5 may be identical to the other features of at least one of learning apparatuses from the learning apparatus 2 to the learning apparatus 4.

5-1: Learning Operation Performed by the Learning Apparatus 5

In the fifth example embodiment, in step S20 shown in FIG. 6, the acquisition portion 211 acquires as the video MV, a sample video and learning information including a correct label indicating which object is a sample object, the sample object being included in each of a plurality of sample frames included in the sample video.

In step S23, the detection portion 213 detects the sample object included in the first sample frame in the plurality of sample frames and the sample object included in the second sample frame in the plurality of sample frames respectively.

In step S24, the association portion 214 associates the sample object included in the first sample frame and the sample object included in the second sample frame with each other.

The learning portion 215 makes the association portion 214 learn the association method for the object on the basis of the correct label and the association result by the association portion 214. That is, the learning apparatus 5 according to the fifth example embodiment performs the supervised learning. The learning portion 215 may make the association portion 214 learn the association method for the object on the basis of the loss function that the loss increases as increase of a degree that the association result by the association portion 214 is not similar to the association result based on the correct label.

FIG. 11A to FIG. 11D is a conceptual diagram exemplifying the learning operation to be performed by the learning apparatus 5 according to the fifth example embodiment. For example, a case that the one pair selected in step S22 is a pair of frames [6] and [3] will be described.

FIG. 11C shows the object included in the frame [6] and the correct label of the corresponding object. Further, FIG. 11D shows the object included in the frame [3] and the correct label of the corresponding object. As shown in FIGS. 11C and 11D, the correct label for the round object is "a", and the correct label for the square object is "b". That is, as shown by the dashed arrow running between FIG. 11A and FIG. 11B, when the association portion 241 associates the round object included in the frame [6] and the round object included in the frame [3] with each other, it may be determined that the association is successful.

For example, it is assumed that, as shown by the solid-line arrow running between FIG. 11A and FIG. 11B, the association portion 214 associates the sample object A included in the frame [6] as the first sample frame and the sample object A included in the frame [3] as the second sample frame with each other. Since the association result indicated by the dashed arrow and the association result indicated by the solid arrow are not similar to each other, the loss function used by the learning portion 215 may be increased.

5-3: Technical Effectiveness of the Learning Apparatus 5

Since the learning apparatus 5 according to the fifth example embodiment makes the association portion 214 learn the association method for the object by the supervised learning, the learning accuracy can be improved.

6: Sixth Example Embodiment

A sixth example embodiment of the tracking apparatus, tracking method and recording medium will be described. In the following, the sixth example embodiment of the tracking apparatus, tracking method, and recording medium will be described by using a tracking apparatus 6 to which the sixth example embodiment of the tracking apparatus, tracking method, and recording medium is applied.

6-1: Configuration of the Learning Apparatus 6

Figure 12:
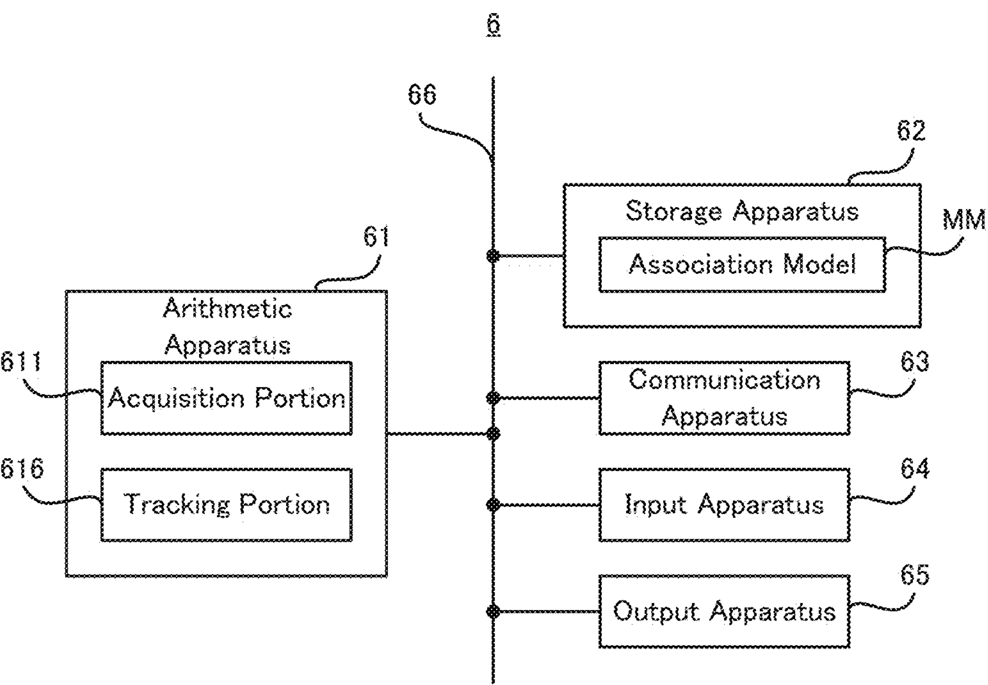
FIG. 12 is a block diagram showing a configuration of a tracking apparatus according to a sixth example embodiment.

Referring to FIG. 12, the configuration of the tracking apparatus 6 according to the sixth example embodiment will be described. FIG. 12 is a block diagram showing the configuration of the tracking apparatus 6 according to the sixth example embodiment.

As shown in FIG. 12, the tracking apparatus 6 comprises an arithmetic apparatus 61 and a storage apparatus 62. Furthermore, the tracking apparatus 6 may comprise a communication apparatus 63, an input apparatus 64, and an output apparatus 65. However, the tracking apparatus 6 may not comprise at least one of the communication apparatus 63, the input apparatus 64, and the output apparatus 65. The arithmetic apparatus 61, the storage apparatus 62, the communication apparatus 63, the input apparatus 64, and the output apparatus 65 may be connected through the data bus 66.

The arithmetic apparatus 61 includes at least one of, for example, CPU (Central Processing Unit), GPU (Graphics Processing Unit), and FPGA (Field Programmable Gate Array). The arithmetic apparatus 61 reads a computer program. For example, the arithmetic apparatus 61 may read a computer program stored in the storage apparatus 62. For example, the arithmetic apparatus 61 may read a computer program stored in a computer-readable and non-transitory recording medium, using a recording medium reading apparatus (not shown) provided by the tracking apparatus 6 (e.g., the input apparatus 64, described later). The arithmetic apparatus 61 may acquire (i.e., download or read) via the communication apparatus 63 (or the other communication apparatus), a computer program from a not-shown apparatus disposed outside the tracking apparatus 6. The arithmetic apparatus 61 executes the computer program loaded. Consequently, in the arithmetic apparatus 61, logical function blocks for executing operations to be performed by the tracking apparatus 6 are realized. In other words, the arithmetic apparatus 61 can function as a controller for realizing the logical function blocks for executing operations (in other words, processing) to be performed by the tracking apparatus 6.

In FIG. 12, there is shown an example of the logical function blocks realized in the arithmetic apparatus 61, for performing the learning operation. As shown in FIG. 12, there are realized in the arithmetic apparatus 61, an acquisition portion 611 which is a specific example of the "acquisition unit" described in the after-mentioned supplementary notes and the tracking portion 616 which is a specific example of the "tracking unit" described in the after-mentioned supplementary notes.

The storage apparatus 62 is capable of storing desired data. For example, the storage apparatus 62 may temporarily store computer programs that are executed by the arithmetic apparatus 61. The storage apparatus 62 may temporarily store data that is temporarily used by the arithmetic apparatus 61 when the arithmetic apparatus 61 is running a computer program. The storage apparatus 62 may store data that the tracking apparatus 6 holds in the long term. The storage apparatus 62 may include at least one of a RAM (Random Access Memory), a ROM (Read Only Memory,) a hard-disk apparatus, a magneto-optical disk apparatus, an SSD (Solid State Drive) and a disk-array apparatus. That is, the storage apparatus 62 may include a non-transitory recording medium.

The storage apparatus 62 may store parameters that define the operations of the association model MM. The association model MM may be an association model MM constructed by at least one of the learning apparatuses: from the learning apparatus 2 in the second example embodiment to the learning apparatus 5 in the fifth example embodiment. However, the storage apparatus 62 may not store the parameters that define the operations of the association model MM.

The communication apparatus 63 can communicate with an apparatus external to the tracking apparatus 6 via a communication network, not shown. The communication apparatus 63 may acquire the video MV used for a tracking operation from an imaging apparatus through the communication network.

The input apparatus 64 is an apparatus that accepts information inputted to the tracking apparatus 6 from the outside of the tracking apparatus 6. For example, the input apparatus 64 may include an operating apparatus operable by an operator of the tracking apparatus 6 (e.g., at least one of a keyboard, a mouse, and a touch panel). For example, the input apparatus 64 may include a read apparatus that can read information stored in an external recording medium to the tracking apparatus 6.

The output apparatus 65 is an apparatus that outputs information to the outside of the tracking apparatus 6. For example, the output apparatus 65 may output information as an image. In other words, the output apparatus 65 may include a display apparatus (so-called a display) that is capable of displaying an image indicating information to be outputted. For example, the output apparatus 65 may output information as sound. That is, the output apparatus 65 may include an audio apparatus (so-called a speaker) capable of outputting sound. For example, the output apparatus 65 may output information to the paper surface. In other words, the output apparatus 65 may include a print apparatus (so-called printer) that can print desired information on the paper surface.

6-2: Tracking Operation Performed by the Tracking Apparatus 6

Figure 13:
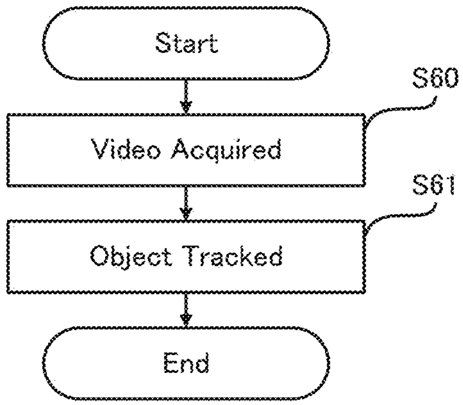
FIG. 13 is a flow chart showing a flow of a tracking operation performed by the tracking apparatus according to the sixth example embodiment.

Referring to FIG. 13, a flow of the tracking operation performed by the tracking apparatus 6 according to the sixth example embodiment will be described. FIG. 13 is a flow chart showing the flow of the tracking operation performed by the tracking apparatus 6 according to the sixth example embodiment. The tracking apparatus 6 according to the sixth example embodiment may track the object on-line.

As shown in FIG. 13, the acquisition portion 611 acquires the video MV (step S60). The acquisition portion 611 may acquire the video MV for each frame.

The tracking portion 616 tracks an object included in the video MV (step S61). The tracking portion 616 may track a plurality of objects included in the video MV.

The tracking portion 616 may have an association model MM constructed by being made to learn the association method for the object. The tracking portion 616 may track the object on the basis of the association of the object by the association model MM, the object being included in each of the frames included in the video MV. The association model MM, as described above, may be the association model MM constructed by at least one of the learning apparatuses: from the learning apparatus 2 in the second example embodiment to the learning apparatus 5 in the fifth example embodiment.

The tracking apparatus 6 according to the sixth example embodiment can be applied to a scene of tracking a person, particularly a scene where biometric authentication is performed with respect to a moving person.

6-3: Technical Effectiveness of the Tracking Apparatus 6

Since the tracking apparatus 6 according to the sixth example embodiment performs tracking using the association model MM that is learned with high accuracy, the object can be tracked with high accuracy.

7: Supplementary Note

With respect to the example embodiments described above, the following supplementary notes will be further disclosed.

Supplementary Note 1

A learning apparatus comprises: an acquisition unit that is configured to acquire a single video; an extraction unit that is configured to extract a plurality of sets from a plurality of frames included in the single video, each of the plurality of sets including a first frame and a second frame different from the first frame; a detection unit that is configured to detect an object included in the first frame and the object included in the second frame respectively; an association unit that is configured to associate the object included in the first frame and the object included in the second frame with each other; and a learning unit that is configured to make the association unit learn an association method for the object based on association results by the association unit with respect to the plurality of sets, wherein the plurality of sets include: a first set in which a time interval between the first and second frames is a first interval; and a second set in which a time interval between the first and second frames is a second interval different from the first interval.

Supplementary Note 2

The learning apparatus according to the supplementary note 1, wherein the extraction unit is configured to select randomly the first frame and the second frame from the plurality of frames for extracting the plurality of sets.

Supplementary Note 3

The learning apparatus according to the supplementary note 1 or 2, wherein the extraction unit is configured to select the second frame existing a predetermined number of frames forward or backward from the first frame.

Supplementary Note 4

The learning apparatus according to any one of the supplementary notes 1 to 3, wherein the learning unit is configured to calculate a learning loss based on the association results and make the association unit learn the association method using the learning loss.

Supplementary Note 5

The learning apparatus according to any one of the supplementary notes 1 to 4, wherein the learning unit is configured to make the association unit learn the association method for the object, based on: a forward-direction association result in which the object included in the second frame existing after the first frame is associated with the object included in the first frame; and a reverse-direction association result in which the object included in the first frame existing before the second frame is associated with the object included in the second frame.

Supplementary Note 6

The learning apparatus according to the supplementary 5, wherein the learning unit is configured to make the association unit learn the association method for the object, based on a loss function in which a loss increases according to increase of a degree that the forward-direction association result is not similar to the reverse-direction association result.

Supplementary Note 7

The learning apparatus according to the supplementary note 5 or 6, wherein the detection unit is configured to detect the object included in the first frame and a position of the object, and the object included in the second frame and a position of the object respectively, the learning unit is configured to make the association unit learn the association method for the object, based on at least one of: a first comparison result between a position where a first object is included in the first frame in the forward-direction association result and a position where the first object is included in the first frame in the reverse-direction association result; and a second comparison result between a position where a second object is included in the second frame in the forward-direction association result and a position where the second object is included in the second frame in the reverse-direction association result.

Supplementary Note 8

The learning apparatus according to any one of the supplementary notes 1 to 7, wherein the acquisition unit is configured to acquire a sample video and learning information including a correct label indicating which object is a sample object, the sample object being included in each of a plurality of sample frames included in the sample video, the detection unit is configured to detect the sample object included in a first sample frame in the plurality of sample frames; and the sample object included in a second sample frame in the plurality of sample frames respectively, the association unit is configured to associate the sample object included in the first sample frame and the sample object included in the second sample frame with each other, and the learning unit is configured to make the association unit learn the association method for the object based on the correct label and an association result by the association unit.

Supplementary Note 9

A tracking apparatus comprising: an acquisition unit that is configured to acquire a video; and a tracking unit that is configured to comprise an association unit generated by being made to learn an association method for an object, by extracting a plurality of sets from a plurality of frames included in a single video, each of the plurality of sets including a first frame and a second frame different from the first frame, and detecting the object included in the first frame and the object included in the second frame respectively, based on association results with respect to the plurality of sets where the object included in the first frame and the object included in the second frame that are associated with each other, and track the object included in the video based on association of the object by the association unit, wherein the plurality of sets include: a first set in which a time interval between the first and second frames is a first interval; and a second set in which a time interval between the first and second frames is a second interval different from the first interval.

Supplementary Note 10

A learning method comprises: acquiring a single video; extracting a plurality of sets from a plurality of frames included in the single video, each of the plurality of sets including a first frame and a second frame different from the first frame; detecting an object included in the first frame and the object included in the second frame respectively; associating, by using an association mechanism, the object included in the first frame and the object included in the second frame with each other; and making the association mechanism learn an association method for the object based on association results by the association mechanism with respect to the plurality of sets, wherein the plurality of sets include: a first set in which a time interval between the first and second frames is a first interval; and a second set in which a time interval between the first and second frames is a second interval different from the first interval.

Supplementary Note 11

A recording medium on which a computer program is recorded, the computer program being configured to allow a computer to execute a learning method comprising: acquiring a single video; extracting a plurality of sets from a plurality of frames included in the single video, each of the plurality of sets including a first frame and a second frame different from the first frame; detecting an object included in the first frame and the object included in the second frame respectively; associating, by using an association mechanism, the object included in the first frame and the object included in the second frame with each other; and making the association mechanism learn an association method for the object based on association results by the association mechanism with respect to the plurality of sets, wherein the plurality of sets include: a first set in which a time interval between the first and second frames is a first interval; and a second set in which a time interval between the first and second frames is a second interval different from the first interval.

Supplementary Note 12

A tracking method comprises: acquiring a video; and comprising an association unit generated by being made to learn an association method for an object, by extracting a plurality of sets from a plurality of frames included in a single video, each of the plurality of sets including a first frame and a second frame different from the first frame, and detecting the object included in the first frame and the object included in the second frame respectively, based on association results with respect to the plurality of sets where the object included in the first frame and the object included in the second frame that are associated with each other, and tracking the object included in the video based on association of the object by the association unit, wherein the plurality of sets include: a first set in which a time interval between the first and second frames is a first interval; and a second set in which a time interval between the first and second frames is a second interval different from the first interval.

Supplementary Note 13

A recording medium on which a computer program is stored, the computer program being configured to allow a computer to execute a tracking method comprising: acquiring a video; and comprising an association unit generated by being made to learn an association method for an object, by extracting a plurality of sets from a plurality of frames included in a single video, each of the plurality of sets including a first frame and a second frame different from the first frame, and detecting the object included in the first frame and the object included in the second frame respectively, based on association results with respect to the plurality of sets where the object included in the first frame and the object included in the second frame that are associated with each other, and tracking the object included in the video based on association of the object by the association unit, wherein the plurality of sets include: a first set in which a time interval between the first and second frames is a first interval; and a second set in which a time interval between the first and second frames is a second interval different from the first interval.

At least a part of the constituent components of the above-described example embodiments can be appropriately combined with at least the other part of the constituent components of the above-described example embodiments. A part among the constituent components of the above-described example embodiments may not be used. Also, to the extent permitted by law, the disclosure of all references cited in the above-mentioned disclosure (e.g., the 'Patent Literature) is incorporated as a part of the description of this disclosure.

This disclosure may be appropriately modified in a range which is not contrary to the technical idea which can be read throughout the claims and whole specification. The learning apparatus, learning method, tracking apparatus, tracking method, and recording medium with such modifications are also included in the technical idea of this disclosure.

DESCRIPTION OF REFERENCE SIGNS

1,2,3,4,5 Learning apparatus
11,211,611 Acquisition portion
12,212 Extraction portion
13,213 Detection portion
14,214 Association portion
15,215 Learning portion
MM Association model
6 Tracking apparatus
616 Tracking portion

What is claimed is:

1. A learning apparatus comprising:

at least one memory configured to store instructions; and at least one processor configured to execute the instructions to:

acquire a single video;

extract a plurality of sets from a plurality of frames included in the single video, each of the plurality of sets including a first frame and a second frame different from the first frame;

detect an object included in the first frame and the object included in the second frame respectively;

associate, by using an association mechanism, the object included in the first frame and the object included in the second frame with each other; and make the association mechanism learn an association method for the object based on association results by the association mechanism with respect to the plurality of sets, wherein the plurality of sets include: a first set in which a time interval between the first and second frames is a first interval; and a second set in which a time interval between the first and second frames is a second interval different from the first interval.

2. The learning apparatus according to claim 1, wherein the at least one processor is further configured to execute the instructions to select randomly the first frame and the second frame from the plurality of frames for extracting the plurality of sets.

3. The learning apparatus according to claim 1, wherein the at least one processor is further configured to execute the instructions to select the second frame existing a predetermined number of frames forward or backward from the first frame.

4. The learning apparatus according to claim 1, wherein the at least one processor is further configured to execute the instructions to calculate a learning loss based on the association results and make the association mechanism learn the association method using the learning loss.

5. The learning apparatus according to claim 1, wherein the at least one processor is further configured to execute the instructions to make the association mechanism learn the association method for the object, based on: a forward-direction association result in which the object included in the second frame existing after the first frame is associated with the object included in the first frame; and a reverse-direction association result in which the object included in the first frame existing before the second frame is associated with the object included in the second frame.

6. The learning apparatus according to claim 5, wherein the at least one processor is further configured to execute the instructions to make the association mechanism learn the association method for the object, based on a loss function in which a loss increases according to increase of a degree that the forward-direction association result is not similar to the reverse-direction association result.

7. The learning apparatus according to claim 5, wherein the at least one processor is further configured to execute the instructions to:

detect the object included in the first frame and a position of the object, and the object included in the second frame and a position of the object respectively, make the association mechanism learn the association method for the object, based on at least one of: a first comparison result between a position where a first object is included in the first frame in the forward-direction association result and a position where the first object is included in the first frame in the reverse-direction association result; and a second comparison result between a position where a second object is included in the second frame in the forward-direction association result and a position where the second object is included in the second frame in the reverse-direction association result.

8. The learning apparatus according to claim 1, wherein The at least one processor is further configured to execute the instructions to:

acquire a sample video and learning information including a correct label indicating which object is a sample object, the sample object being included in each of a plurality of sample frames included in the sample video, detect the sample object included in a first sample frame in the plurality of sample frames; and the sample object included in a second sample frame in the plurality of sample frames respectively, associate, by using an association mechanism, the sample object included in the first sample frame and the sample object included in the second sample frame with each other, and make the association mechanism learn the association method for the object based on the correct label and an association result by the association mechanism.

9. A tracking apparatus comprising:

at least one memory configured to store instructions; and at least one processor configured to execute the instructions to:

acquire a video; and comprise an association mechanism generated by being made to learn an association method for an object, by extracting a plurality of sets from a plurality of frames included in a single video, each of the plurality of sets including a first frame and a second frame different from the first frame, and detecting the object included in the first frame and the object included in the second frame respectively, based on association results with respect to the plurality of sets where the object included in the first frame and the object included in the second frame that are associated with each other, and track the object included in the video based on association of the object by the association mechanism, wherein the plurality of sets include: a first set in which a time interval between the first and second frames is a first interval; and a second set in which a time interval between the first and second frames is a second interval different from the first interval.

10. A learning method comprising:

acquiring a single video;

extracting a plurality of sets from a plurality of frames included in the single video, each of the plurality of sets including a first frame and a second frame different from the first frame;

detecting an object included in the first frame and the object included in the second frame respectively;

associating, by using an association mechanism, the object included in the first frame and the object included in the second frame with each other; and making the association mechanism learn an association method for the object based on association results by the association mechanism with respect to the plurality of sets, wherein the plurality of sets include: a first set in which a time interval between the first and second frames is a first interval; and a second set in which a time interval between the first and second frames is a second interval different from the first interval.

* * * * *